United States Patent
Onozuka et al.

(10) Patent No.: US 8,209,594 B2
(45) Date of Patent: Jun. 26, 2012

(54) SENDING DEVICE, RECEIVING DEVICE, COMMUNICATION CONTROL DEVICE, COMMUNICATION SYSTEM, AND COMMUNICATION CONTROL METHOD

(75) Inventors: Akihiro Onozuka, Hitachi (JP); Masakazu Ishikawa, Hitachi (JP); Masamitsu Kobayashi, Hitachi (JP); Takashi Umehara, Hitachi (JP); Shin Kokura, Hitachi (JP); Hiromichi Endoh, Hitachi (JP); Satoru Funaki, Hitachi (JP); Hisao Nagayama, Hitachi (JP); Masahiro Shiraishi, Hitachi (JP); Akira Bando, Hitachi (JP); Eiji Kobayashi, Hitachinaka (JP); Yasuyuki Furuta, Tokai (JP); Naoya Mashiko, Hitachiota (JP)

(73) Assignees: Hitachi, Ltd., Tokyo (JP); Hitachi Information & Control Solutions, Ltd., Ibaraki (JP)

( * ) Notice: Subject to any disclaimer, the term of this patent is extended or adjusted under 35 U.S.C. 154(b) by 79 days.

(21) Appl. No.: 12/900,988

(22) Filed: Oct. 8, 2010

(65) Prior Publication Data

US 2011/0022936 A1 Jan. 27, 2011

Related U.S. Application Data

(63) Continuation of application No. 11/477,440, filed on Jun. 30, 2006, now abandoned.

(30) Foreign Application Priority Data

| Jun. 30, 2005 | (JP) | 2005-190875 |
| Jun. 30, 2005 | (JP) | 2005-190881 |
| Aug. 31, 2005 | (JP) | 2005-250495 |

(51) Int. Cl.
*G06F 11/10* (2006.01)
*H03M 13/00* (2006.01)
(52) U.S. Cl. ........................ 714/807; 714/776
(58) Field of Classification Search .................. 714/776, 714/807, 799
See application file for complete search history.

(56) References Cited

U.S. PATENT DOCUMENTS
4,526,010 A 7/1985 Sato et al.
(Continued)

FOREIGN PATENT DOCUMENTS
JP 51-127607 11/1976
(Continued)

OTHER PUBLICATIONS

Functional safety of electrical/electronic/programmable electronic safety-related systems, IEC, Dec. 1998, p. 11, 13, 15, 17, 19, 33, 65, 89, 91, 93, 95.

*Primary Examiner* — Guy Lamarre
(74) *Attorney, Agent, or Firm* — Antonelli, Terry, Stout & Kraus, LLP.

(57) ABSTRACT

A receiving device including: a receiver receiving two frames, each including substantially same data attached thereto with a data error detection code, a frame error detection code, and safety flag information indicating a safety function or not, respectively; a first detector connected to the receiver for performing error detection of the frames by use of the frame error detection code, respectively; a second detector connected to the receiver for performing error detection of the data by use of the data error detection code, respectively; and a Direct Memory Access Controller (DMAC) connected to the first and second detectors for outputting one among the data included in the two frames under a condition of the safety function in the two frames when no error is detected in the frame and data error detections.

6 Claims, 13 Drawing Sheets

U.S. PATENT DOCUMENTS

| | | | |
|---|---|---|---|
| 6,112,324 A * | 8/2000 | Howe et al. | 714/763 |
| 6,374,387 B1 | 4/2002 | van den Berghe | |

FOREIGN PATENT DOCUMENTS

| | | |
|---|---|---|
| JP | 55-107358 | 8/1980 |
| JP | 57-93499 | 6/1982 |
| JP | 63-237628 | 10/1988 |
| JP | 02-216928 | 8/1990 |
| JP | 2001-163220 | 6/2001 |
| JP | 2005-049967 | 2/2005 |

* cited by examiner

| LINE NUMBER | INPUT | | | | | | | | | | | OUTPUT | | |
|---|---|---|---|---|---|---|---|---|---|---|---|---|---|---|
| | 3011 FIRST-TYPE TIMEOUT REGISTER | 3141 FIRST-TYPE FRAME ERROR DETECTION RESULT | 3161 FIRST-TYPE DATA ERROR DETECTION RESULT | 3191 FIRST-TYPE SAFETY FLAG | 3201 FIRST-TYPE VALIDITY FLAG | 3012 SECOND-TYPE TIMEOUT REGISTER | 3142 SECOND-TYPE FRAME ERROR DETECTION RESULT | 3162 SECOND-TYPE DATA ERROR DETECTION RESULT | 3192 SECOND-TYPE SAFETY FLAG | 3202 SECOND-TYPE VALIDITY FLAG | 306 MATCHING COMPARISON RESULT | 321 SELECTION | 322 SAFETY FLAG ADDITION - SAFETY FUNCTION | 323 VALIDITY FLAG ADDITION - VALIDITY |
| 1 | 0 | 0 | 0 | 1 | 1 | 0 | 0 | 0 | 1 | 1 | 1 | FIRST TYPE/ SECOND TYPE | 1 | 1 |
| 2 | 0 | 0 | 0 | 1 | 0 | 0 | 0 | 0 | 1 | 0 | 1 | FIRST TYPE/ SECOND TYPE | 1 | 0 |
| 3 | 0 | 0 | x | x | x | 0 | 0 | x | x | x | x | FIRST TYPE/ SECOND TYPE | 0 | SELECTED TYPE |
| 4 | 0 | 1 | x | x | x | x | x | x | x | x | x | SECOND TYPE | 0 | SELECTED TYPE |
| 5 | x | x | x | x | x | 0 | 1 | x | x | x | x | FIRST TYPE | 0 | SELECTED TYPE |
| 6 | x | x | x | x | x | x | x | x | x | x | x | FIRST TYPE/ SECOND TYPE | 0 | 0 |
| LEGEND | 1···TIMEOUT | 1···ERROR DETECTION | 1···ERROR DETECTION | 1···SAFETY FUNCTION | 1···VALIDITY | 1···TIMEOUT | 1···ERROR DETECTION | 1···ERROR DETECTION | 1···SAFETY FUNCTION | 1···VALIDITY | 1···COINCIDENCE | | 1···SAFETY FUNCTION | 1···VALIDITY |

SENDING DEVICE, RECEIVING DEVICE, COMMUNICATION CONTROL DEVICE, COMMUNICATION SYSTEM, AND COMMUNICATION CONTROL METHOD

CROSS REFERENCE TO RELATED APPLICATION

This is a continuation of U.S. application Ser. No. 11/477,440, filed Jun. 30, 2006 now abandoned. This application relates to and claims priority from Japanese Patent Application Nos. 2005-190875, filed on Jun. 30, 2005; No. 2005-190881, filed on Jun. 30, 2005 and No. 2005-250495, filed on Aug. 31, 2005. The entirety of the contents and subject matter of all of the above is incorporated herein by reference.

FIELD OF THE INVENTION

The present invention pertains to a sending device, a receiving device, a communication control device, a communication system, and a communication control method.

BACKGROUND OF THE INVENTION

In recent years, the demand for using, in process control systems, programmable electronically controlling devices which are not only limited to the control of primary plant functions (general functions) but also encompass control with respect to safety functions regarding human life and the environment has intensified. In the control of safety functions, safety is demanded, so for that reason, for one safety indicator with respect to data communication between devices, error detection matching is used and error correction is performed.

However, there is demanded an improvement in the missed error detection rate, the probability of not detecting an error even with error detection, so in order to implement safety, technology has been devised in which two or more frames including data and error detection matching are received and a matching comparison of error detection codes is performed. This kind of technology is described e.g. in JP-A-2005-49967.

Moreover, in the draft of Functional Safety Standard IEC 61508, there are mentioned, as primary factors obstructing safety, resending of the communication path, loss, insertion, erroneous order, delay, and masquerading (forgery), so countermeasures against these are demanded. For these, there is demanded a reduction in the missed error detection rate, the probability of not detecting an error even with error detection, so in order to implement safety, there has been devised the technology of carrying out a matching comparison of safety data having an important influence on the system. This kind of technology is described e.g. in JP-A-1986-134135.

Also, with the advancement of technology in the electronics and information fields, the application range for programmable electronic devices is becoming wider, driven by the increased complication/compositeness of functions demanded of single devices, and at the same time, the reliability demanded of programmable electronic devices is increasing.

In the midst of the progress in increasing scale and the integration of plants and the execution of highly automated plant operation, there are problems with the spread of international safety standards and a lack of experienced persons, and further improvements in safety, beyond the safety measures built up in the past, are in the process of becoming a necessary condition, so, as clearly defined in the functional safety standard IEC 61508-1 to -7, "Functional Safety of Electrical/Electronic/Programmable Electric Safety Related Systems", Parts 1 to 7 (IEC 61508/61511, JIS C 0508), it is regarded as important to prevent and alleviate, in their respective layers, the occurrence of accidents and the extension of damage.

As far as control devices are concerned, in case an anomaly is detected, the system is required, in order to satisfy the aforementioned functional safety standard, to operate with certainty, and even in the unlikely event of a breakdown, it is demanded to stop the processes on the safe side, so the functional safety system needs to have a special design with great importance attached to "safety" different from that of the control system.

Also, in large-scale control systems, distributed control systems with process input/output devices having sensors installed in the vicinity of the process and controllers installed in a control room slightly separated from the process are becoming the mainstream, so it is becoming important, as far as functional safety is concerned, to find out how to prevent faulty operation of the process input/output device due to error in data communication between the controller and the process input output devices.

As one of the most common error detection methods in data transmission, there is CRC (Cyclic Redundancy Check), as described in JP-A-1999-74869.

SUMMARY OF THE INVENTION

Since the aforementioned prior art does not perform a matching comparison of the body of the data, there are limitations on improvements in safety. Specifically, the demand for high safety is not sufficiently addressed. Moreover, in general function control, availability is demanded.

Since the aforementioned prior art does not carry out a matching comparison at the data sender, there are limitations on improvements in safety. Also, detection of masquerading (forgery) in data communication occurring in functional safety systems is required.

In terms of the elements of reliability required of a programmable electronic device, there are availability and safety. For equipment control, availability is important, whereas for equipment protection, safety is important. Means of implementation of these two elements have many portions which are mutually exclusive.

For this reason, it has in the past been considered to be common practice to split the system into a partial device assuming responsibility for availability and a partial device assuming responsibility for safety. Because of this, the device did not only increase in size, but the duplication and increased complication of the work of putting into operation and maintenance brought about a reduction in the reliability of the human element.

It is an object of the present invention to provide a sending device, a receiving device, a communication control device and a communication control method capable of solving at least one of the aforementioned conventional problem areas, and, specifically, to provide a system which, together with having, with respect to the safety function, a high safety function for the reduction and so forth of the missed error correction rate and the like, is capable, with respect to the general function, of obtaining availability.

Also, it is an object of the present invention to provide, together with reducing the missed error detection rate with respect to the safety function, a system which is capable of detecting masquerading.

In addition, it is an object of the present invention to provide a system compatible with both high performance and safety.

In order to attain the aforementioned object, in the present invention, a system has been configured to: receive a frame including data and safety flag information indicating the safety level; extract data and safety flag information from the aforementioned frame; and, in response to the aforementioned extracted safety level, carry out communication error detection of the aforementioned received data. Alternatively, a system has been configured to: receive the transfer of the data; receive the transfer of safety flag information indicating the safety level; generate a frame on the basis of the aforementioned data and safety flag information; and send the aforementioned frame as serial communication.

More specifically, in a communication control device consisting of: a means of generating a packet including transmission data, and a frame including one frame error detection code generated from the aforementioned packet; a sending device having a means of sending the aforementioned frame and having a plurality of sending means; a plurality of transmitting means; a means of detecting a plurality of frame errors from a plurality of received frames received by means of a plurality of receiving means; a means of selecting one received frame from the aforementioned plurality of frames and adding validity flags extracting transmission data; the system being configured to provide, in the aforementioned sending device: a means of generating transmission data including data, a safety flag showing the reliability of the aforementioned data, and a data error detection code generated from the aforementioned data; and to provide, in the aforementioned receiving device: a plurality of means extracting, from the aforementioned received frame, data and safety flags and data error correction codes, and detecting data errors; a means of comparing the aforementioned plurality of received frames; a means of selecting one received frame from the aforementioned frame error detection result, the aforementioned safety flag, the aforementioned data error detection result, and the aforementioned matching comparison result; and a means of judging the validity of the transmission data, by means of the detection method corresponding to the degree of reliability set in the safety flag.

Also, in order to attain the aforementioned object, the system has been configured to: send data to the sending destination communication control device through communication lines which at least in part have serial transmission; receive data sent through communication lines from the sending destination control device; compare the matching of the sent data and the received data; and, based on the matching comparison result, send output permission information showing output permission of previously sent data through communication lines to the sending destination communication control device.

More specifically, in a communication system consisting of: a data sending side device, a data receiving side device, and communication lines making a connection in series between the aforementioned devices; the system has been configured so that the aforementioned data receiving side device sends the received data by echo back, the data and the echo back are compared in the aforementioned data sending side device, the result is sent, and the aforementioned data receiving side judges the validity of the data by means of the aforementioned matching comparison result.

More specifically, in a communication control device consisting of a master communication control device and a slave communication control device connected to the output circuit, the system has been configured so that the aforementioned master communication control device sends the output data, the aforementioned slave communication control device sends the echo back of the aforementioned output data, the aforementioned master communication control device compares the matching of the aforementioned output data and the aforementioned echo back, the aforementioned master communication control device compares the matching of the aforementioned output data and the aforementioned echo back, and in case they coincide, permission is given for output to the aforementioned slave communication control device.

Also, in a communication control device consisting of a master communication control device and a slave communication control device connected to the input circuit, the system has been configured so that the aforementioned slave communication control device sends the input data, the aforementioned master communication control device sends the echo back of the aforementioned input data, the aforementioned slave communication control device compares the matching of the aforementioned input data and the aforementioned echo back, and in case they coincide, permission is given for input to the aforementioned master communication control device.

In addition, in order to attain the aforementioned object, the system has been configured to: receive data showing the relative level of safety; generate error codes regarding the respective plural data units; and generate data from the data showing the relative level of safety, the plural data units, and respective error codes added in case the data units have relatively high safety; and further to generate error codes regarding at least part of the generated data and add the generated data. Alternatively, the system has been configured to: receive data showing the relative level of safety; judge whether the received frame is in error from the received error code; and, in case the data unit has a relatively high level of safety, judge, for the respective unit data included in the received frame, whether the unit data are in error, from the corresponding plural error codes.

In this way, concerning the safety function, it is possible to obtain high safety with a reduction in the missed error correction rate and the like, and further, availability with respect to e.g. general functions and the like can be obtained.

Also, regarding the safety function, together with reducing the missed error detection rate, it is possible to implement detection of masquerading.

By means of handshake communication, a check of the sending source and destination addresses of the frame, and a matching comparison of data and the echo back, it is possible to implement masquerading.

Also, it becomes possible for high performance and safety to coexist.

BRIEF DESCRIPTION OF THE DRAWINGS

FIG. 4 shows a reception judgment of the embodiment.

DETAILED DESCRIPTION OF THE EMBODIMENTS

Below, embodiments of the present invention will be explained.

Figure 1:
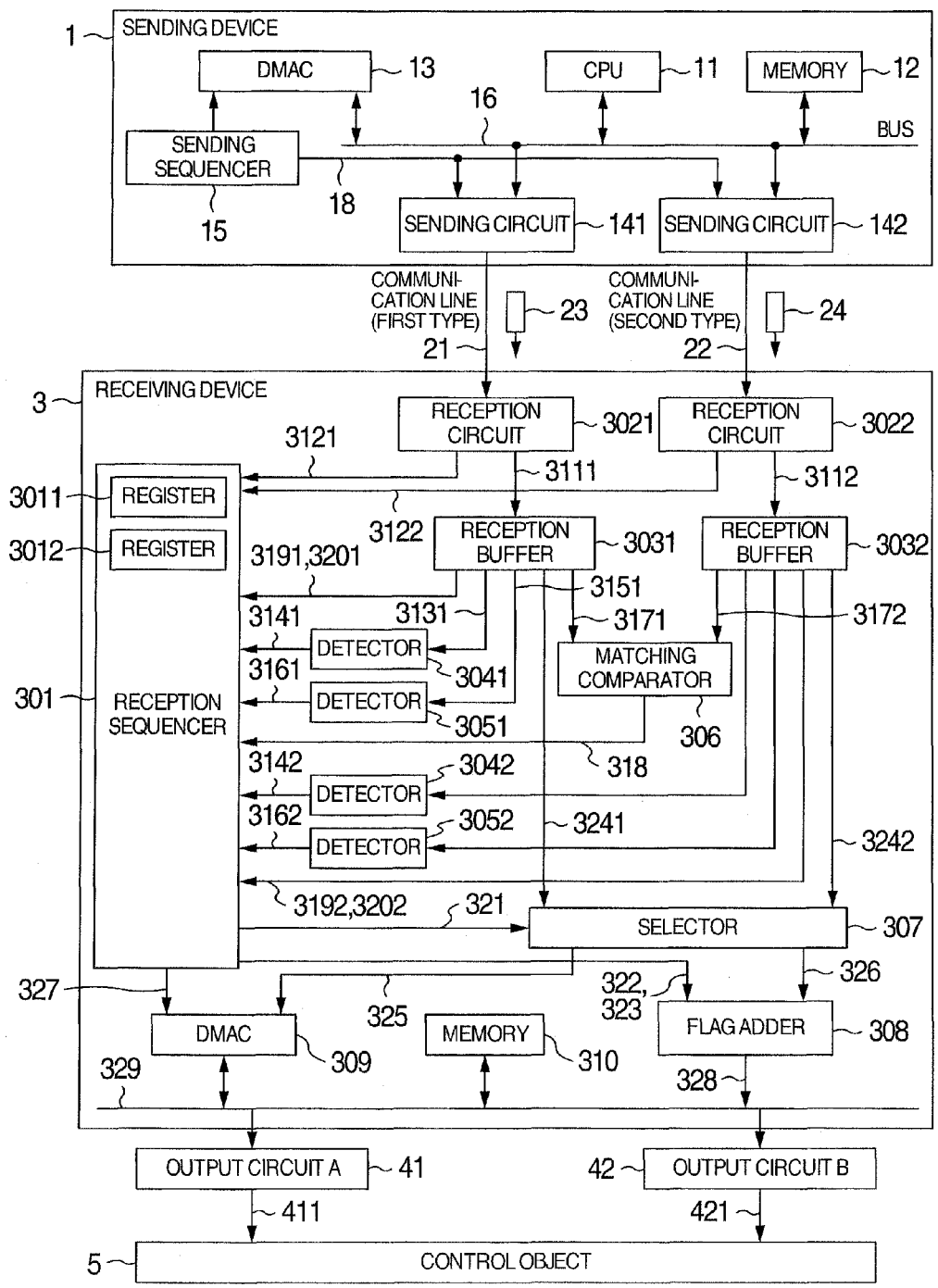
FIG. 1 shows the system of an embodiment of the present invention.

A system using a communication control device of an embodiment of the present invention is shown in FIG. 1.

The inventive system consists of a sending device 1, a first-type communication line 21, a second-type communication line 22, a receiving device 3, an output circuit A 41, an output circuit B 42, and a control object 5.

Sending device 1 consists of a CPU (Central Processing Unit) 11, a memory 12, a DMAC (Direct Memory Access Controller) 13, a first-type sending circuit 141, a second-type sending circuit 142, and a sending sequencer 15.

Figure 2:
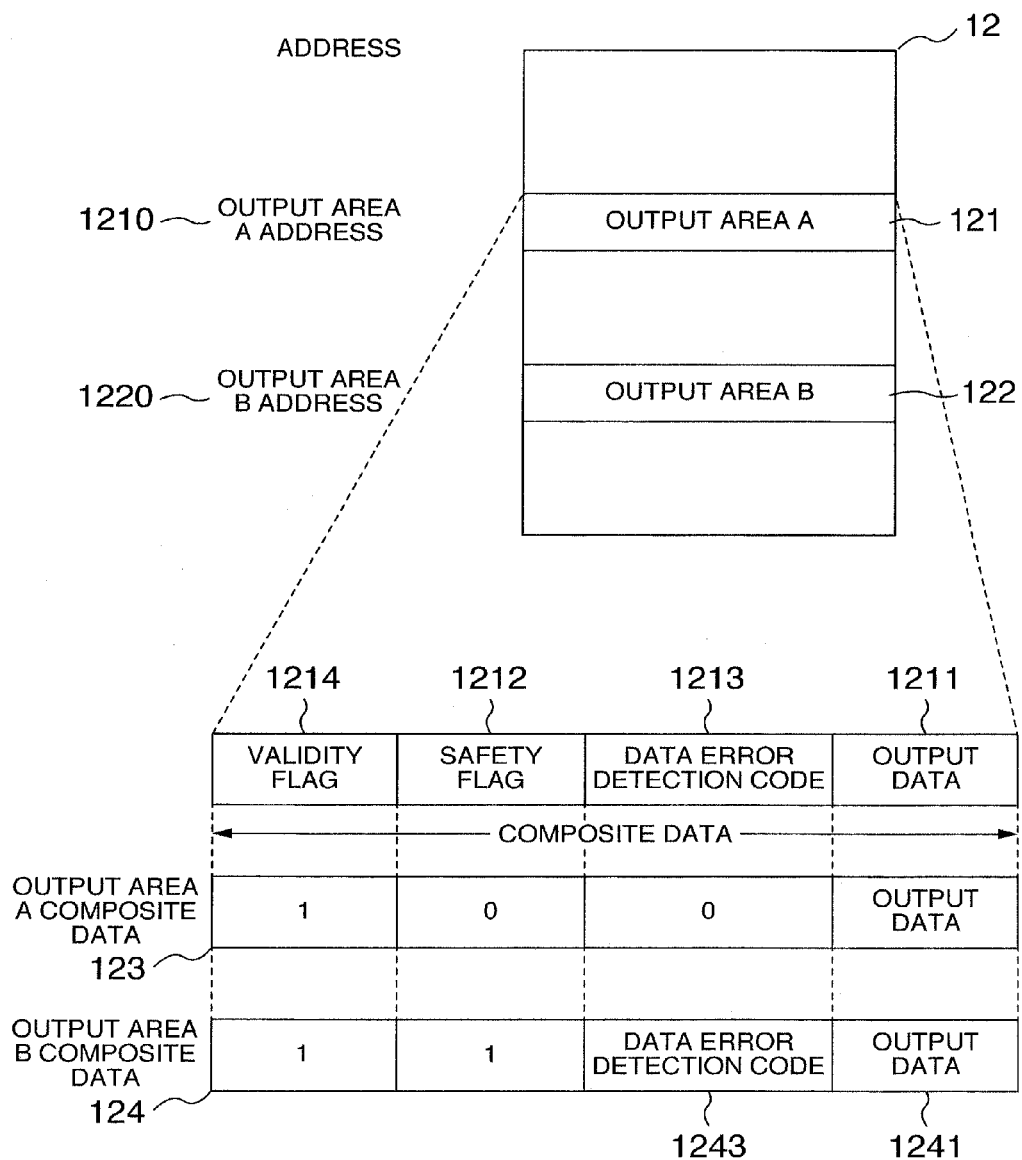
FIG. 2 shows a memory of the embodiment

The details of memory 12 will be explained using FIG. 2.

In memory 12, there is allocated an output area A 121, an area for carrying out control of output circuit A 41.

Output area A 121 consists of output data 1211, a safety flag 1212 indicating whether the output data are a safety function, a data error detection code 1213, and a validity flag 1214.

In the same way, an output circuit B area 122 is allocated.

When output circuit A 41 is a general function, CPU 11 writes composite data 123 to output area A 121. The validity flag is allocated 1, the safety flag 0, and data error detection code 1233 is allocated 0.

When output circuit B 42 is a safety function, CPU 11 writes composite data 124 to output area B 122. The validity flag is allocated 1 and the safety flag 1, and CPU 11 allocates a value computed from output data 1241 to a data error detection code 1243.

The control object consists of a plurality of control devices, and the system designer selects, depending of the degree of safety required in each of the control devices, whether a general function or a safety function is chosen. E.g., at a manufacturing site, a safety function is selected for emergency stop control devices related to human life, and a general function is selected for other devices. In this way, general functions and safety functions differ by object to be controlled, but the output data themselves are the same data.

Figure 3:
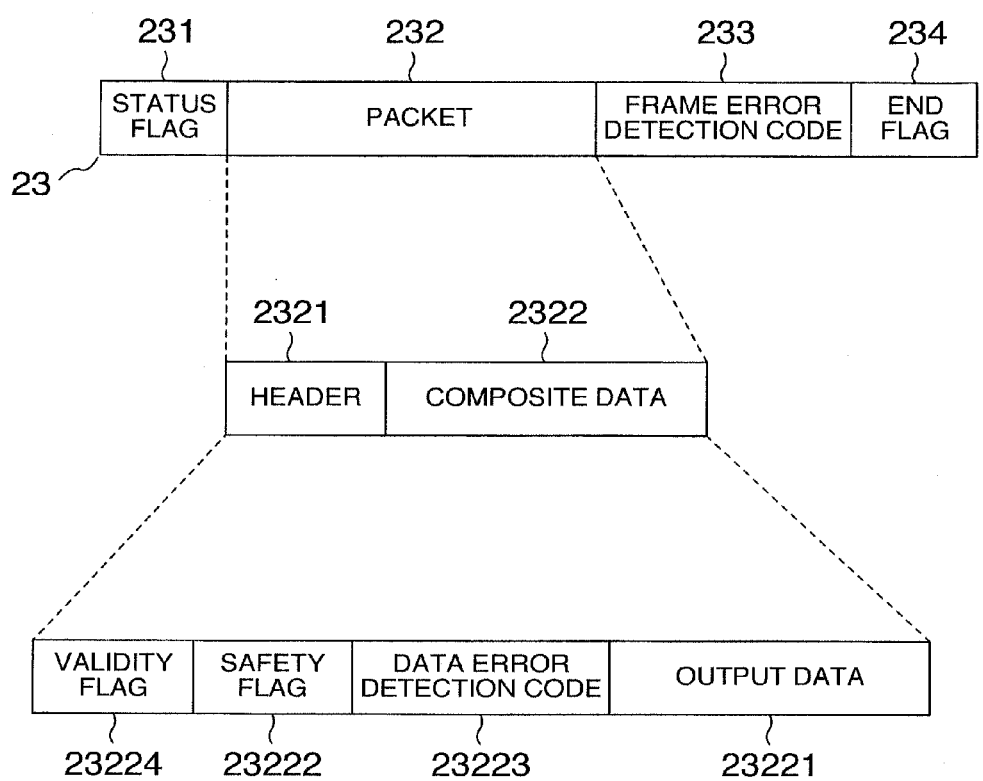
FIG. 3 shows a frame of the embodiment.

The details of frame 23 will be explained using FIG. 3.

Frame 23 consists of a start flag 231, a packet 232, a frame error detection code 233, and an end flag 234. Packet 232 consists of a header 2321 and composite data 2322. The address of memory 12 is allocated to header 2321.

The flow of data from memory 12 up to first-type communication line 21 and second-type communication line 22 will be explained using FIG. 1, FIG. 2, FIG. 3, and FIG. 5.

A sending sequencer 15 instructs 17, to DMAC (Direct Memory Access Controller) 13, a transfer source address (address 1210 of output area A 121) and a transfer activation, and transfers, via a bus 16, composite data 123, a value read from output area A 121, to a first-type sending circuit 141 and a second-type sending circuit 142. The sending source address is transferred from DMAC 13 to first-type sending circuit 141 and second-type sending circuit 142. The same holds true for output area B 122. Next, a request to send 18 (t1) is instructed from sending sequencer 15 to first-type communication line 141 and second-type sending circuit 142. First-type sending circuit 141 generates a packet 232 from transfer source address 1210 and composite data 123, computes a frame error detection code 233 from packet 232, generates frame 23, and sends it to a communication line 21 (t11). Similarly, a frame 24 is sent from second-type sending circuit 142 to communication line 22 (t12). Frame 23 and frame 24 have the same contents. Sending sequencer 15 generates frames from output area A 121 and output area B 122 and executes sending at regular intervals.

The data flow from first-type communication line 21 and second-type communication line 22 up to memory 310 will be explained using FIG. 1, FIG. 3, FIG. 4, and FIG. 5.

Receiving device 3 consists of a reception sequencer 301, a first-type reception circuit 3021, a second-type receiving circuit 3022, a first-type reception buffer 3031, a second-type reception buffer 3032, a first-type frame error detector 3041, a second-type frame error detector 3042, a first-type data error detector 3051, a second-type data error detector 3052, a matching comparator 306, a selector 307, a flag adder 308, a DMAC 309, and a memory 310. When first-type frame 23 received from first-type communication line 21 (t13) has reception completed in first-type reception circuit 3021, it is transferred 3111 to reception buffer 3031, and when this is completed, it is reported with a first-type reception completion 3121 (t2) report to reception sequencer 301. In the same way, when second-type frame 24 is received (t14), it is reported with a second-type reception completion 3122 report (t3) to reception sequencer 301.

First-type frame error detector 3041 receives 3131 packet 232 and frame error detection code 233 from reception buffer 3031, performs frame error detection, and reports a first-type frame error detection result 3141 (t4). In the same way, second-type frame error detector 3042 reports a second-type frame error detection result 3142 (t5).

First-type data error detector 3051 receives 3151 output data 23221 and data error detection code 23223 from reception buffer 3031, performs data error detection, and reports a first-type data error detection result 3161 (t4). In the same way, second-type data error detector 3052 reports a second-type data error detection result 3162 (t5).

Matching comparator 306 receives 3171, 3172 output data 23221 from first-type reception buffer 3031 and second-type reception buffer 3032, compares the matching of all the bits, and reports a data matching comparison result 318 (t6).

A first-type safety flag 3191 and a first-type validity flag 3201 are received from first-type reception buffer 3031. A second-type safety flag 3192 and a second-type validity flag 3202 are received from second-type reception buffer 3032. Reception sequencer 301 clears either a first-type timeout register 3011 or a second-type timeout register 3012, based on a first-type reception completion 3121 report or a second-type reception completion 3122 report. After the first-type reception completion 3121 report, reception sequencer 301 sets second-type timeout register 3012 if there is no second-type reception completion 3122 report within a determined time. In the same way, if there is no first-type reception completion 3121 report, first-type timeout register 3011 is set. After two types of reception completion or timeouts, reception sequencer 301 makes a reception judgment 3013, selects 321 a selector 307, and reports safety flag addition 322 and validity flag addition 323 to flag adder 308. Reception judgment 3013 is shown in FIG. 4. The judgment is performed in order starting from line number 1 of reception judgment 3013.

In the line of line number 1 shown in FIG. 4, first-type timeout register 3011 is shown as "0", first-type frame error detection result 3141 as "0", first-type data error detection result 3161 as "0", first-type safety flag 3191 as "1", and first-type validity flag 3201 as "1", and further, second-type timeout register 3012 is shown as "0", second-type frame error detection result 3142 as "0", second-type data error detection result 3162 as "0", second-type safety flag 3192 as "1", second-type validity flag 3202 as "1", and matching comparison result 306 as "1", and when these conditions are satisfied, selection 321 is set to "first-type/second-type", safety flag addition 322 is set to "1" and validity flag addition 323 is set to "1".

That is to say that, (1) regarding first-type timeout register 3011, since the timeout is specified to be "1" in the legend of FIG. 4, it is "0", indicating that that there is no timeout, (2) regarding first-type frame error detection result 3141, since it is specified to be "1" in the legend of FIG. 4 if an error is detected, it is "0", indicating that that there is no error detected, (3) regarding first-type data error detection result 3161, since it is specified to be "1" in the legend of FIG. 4 if an error is detected, it is "0", indicating that there is no error detected, (4) regarding first-type safety flag 3191, since the safety function is specified to be "1" in the legend of FIG. 4, it is "1", indicating that there is a safety function, (5) regarding first-type validity flag 3201, since validity is specified to be "1" in the legend of FIG. 4, it is "1", indicating that there is validity, and these inputs related to the first type are the same for the second type as well, so by reference to the legend of FIG. 4, second-type timeout register 3012 is "0", second-type frame error detection result 3142 is "0", second-type data error detection result 3162 is "0", second-type safety flag 3192 is "1", and second-type validity flag 3202 is "1", (6) regarding matching comparison result 306, since coincidence is specified in the legend of FIG. 4 to be "1", it is "1", indicating coincidence. When the aforementioned conditions are satisfied, selection 321 is set to "first-type/second-type", safety flag addition 322 is set to "1", and validity flag addition 323 is set to "1".

In case the conditions of line number 1 are not satisfied, it is next judged whether the conditions of line number 2 are satisfied. Specifically, in the line of line 2 shown in FIG. 4, when the conditions are satisfied that first-type timeout register 3011 is "0", first-type timeout error detection result 3141 is "0", first-type data error detection result 3161 is "0", first-type safety flag 3191 is "1", and first-type validity flag 3201 is "0", and further that second-type timeout register 3012 is "0", second-type frame error detection result 3142 is "0", second-type data error detection result 3162 is "0", second-type safety flag 3192 is "1", second-type validity flag 3202 is "0", matching comparison result 306 is "1", selection 321 is set to "first-type/second-type", safety flag addition 322 is set to "1", and validity flag addition 323 is set to "0".

Further, the items specified as "×" in the legend of FIG. 4 indicate that they are excluded from the judgment conditions. E.g., in line number 3, first-type data error detection result 3161 is specified as "×", first-type safety flag 3191 as "×", and first-type validity flag 3201 as "×", so even if first-type data error detection result 3161, first-type safety flag 3191, and first-type validity flag 3201 are respectively "1", or "0", it signifies that this exerts no influence on the respective settings of selection 321 to "first-type/second-type" and of safety flag addition 322 and validity flag addition 323.

Reception judgment 3013 is judged as follows from the combination of the inputs.

In line number 1, it is judged that valid safety function data have been received without any anomaly being detected.

In line number 2, it is judged that pre-valid safety function data have been received without any anomaly being detected.

In line number 3, it is judged that general function data have been received from first-type communication line 21 and second-type communication line 22.

In line number 4, it is judged that general function data have been received from second-type communication line 22.

In line number 5, it is judged that general function data have been received from first-type communication line 21.

In line number 6, it is judged that regular reception has not been possible.

Selection 321 has three classes, "first type", "second type", and "first type/second type", the first type being selected in "first type", the second type being selected in "second type", and the present type being switched in "first type/second type". In case the first type was selected in the immediately preceding judgment, the second type is selected. In case the second type was selected in the immediately preceding judgment, the first type is selected.

In selector 307, based on selection 321, either of a first-type received frame 3241 and a second-type received frame is selected. Selector 307 sends 325, from the selected frame, a header 2321 including the write address of memory 310 to DMAC 309. Also, it sends 326 composite data 2322 from the selected frame to flag adder 308.

Flag adder 308, based on safety flag addition 322 and valid flag addition 323, saves a safety flag 23222 and a valid flag 23224 of composite data 2322.

Reception sequencer 301 makes a write request 327 (t7) to DMAC 309 and writes composite data 328 to be written to memory 310 via a bus 329.

Figure 5:
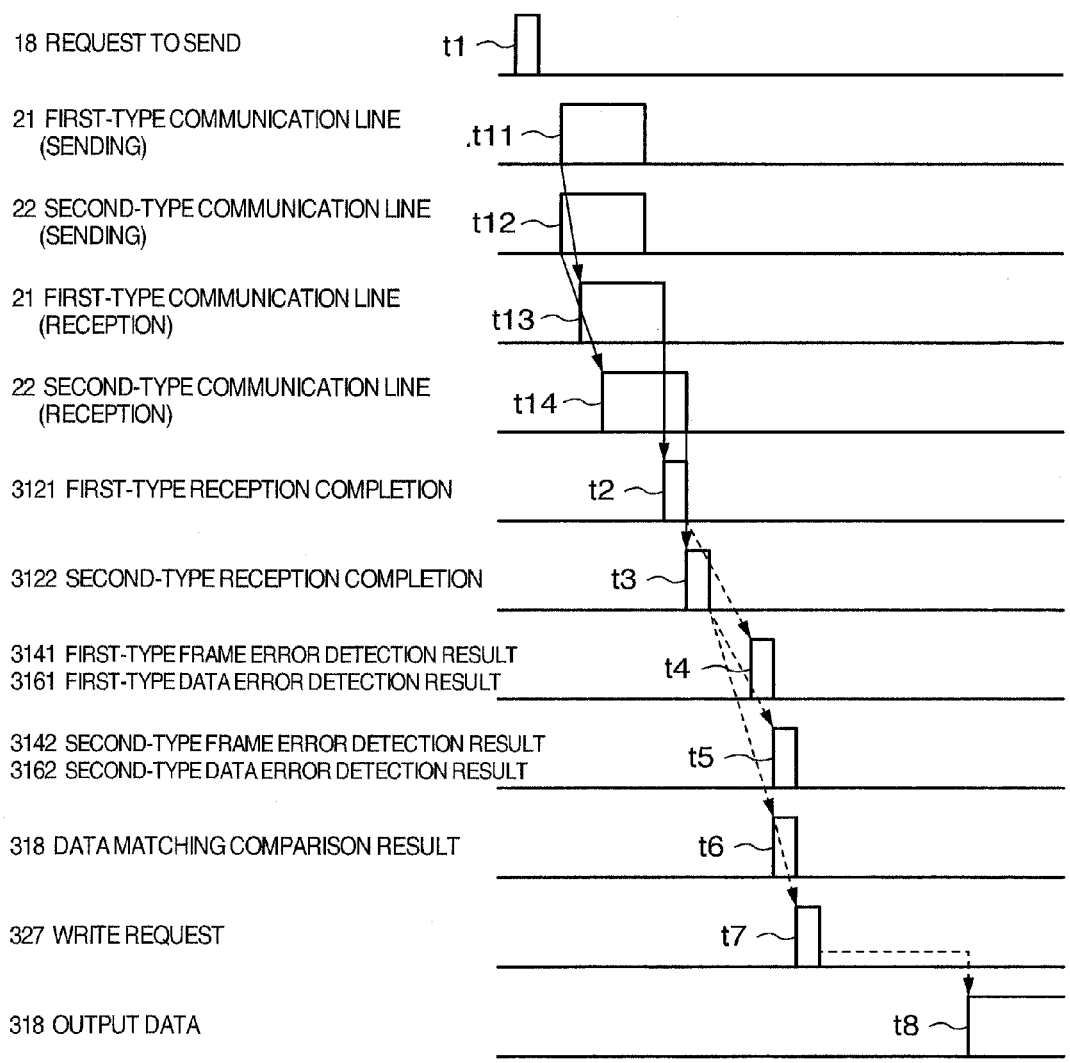
FIG. 5 is a time chart of the embodiment.

The data flow from memory 310 up to control object 5 will be explained using FIG. 1 and FIG. 5.

DMAC 309 transfers (t8) the corresponding composite data from memory 310 to output circuit A 41 and output circuit B 42 at regular intervals.

When output circuit A 41 is a general function control and if validity flag 1214 is valid, it outputs 411 output data 1211. If the flag is not valid, the circuit outputs a predetermined safety output value, or saves a previous value.

When output circuit B 42 is a safety function control and validity flag 1214 is "valid" and safety flag 1212 is "safe", and a data error is detected from output data 1211 and data error detection code 1213 but no error is detected, it outputs 421 output data 1211. In cases other than that, it outputs a preset safety output value, or saves the previous value.

In this way, the inventive system is applied to a process control system in which availability and safety coexist.

Figure 6:
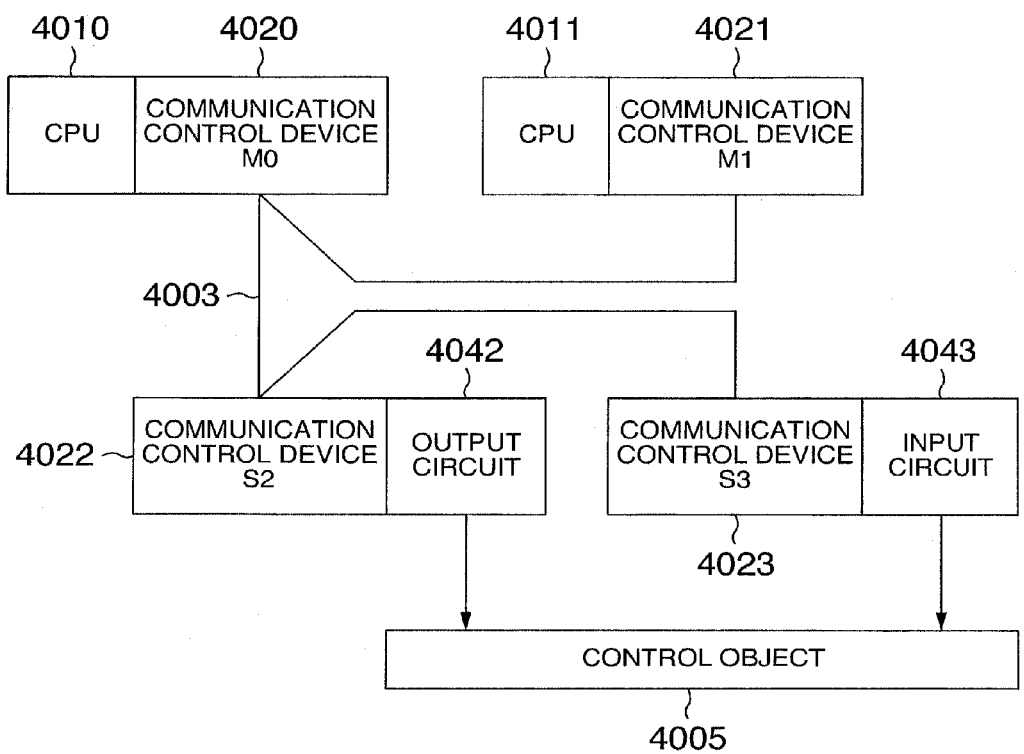
FIG. 6 shows the system of another embodiment of the present invention.

A system using another example of communication control device is shown in FIG. 6. It consists of CPUs 4010, 4011, communication control devices 4020, 4021, 4022, and 4023, a communication line 4003, an output circuit 4042, an input circuit 4043, and a control object 4005. Communication control devices 4020 and 4021 are master communication control devices M0 and M1. Communication control devices 4022 and 4023 are slave communication control devices S2 and S3. Communication line 4003 is a multi-drop connection of a serial communication line, and when each communication control device itself is not sending, it normally carries out reception monitoring.

Figure 7:
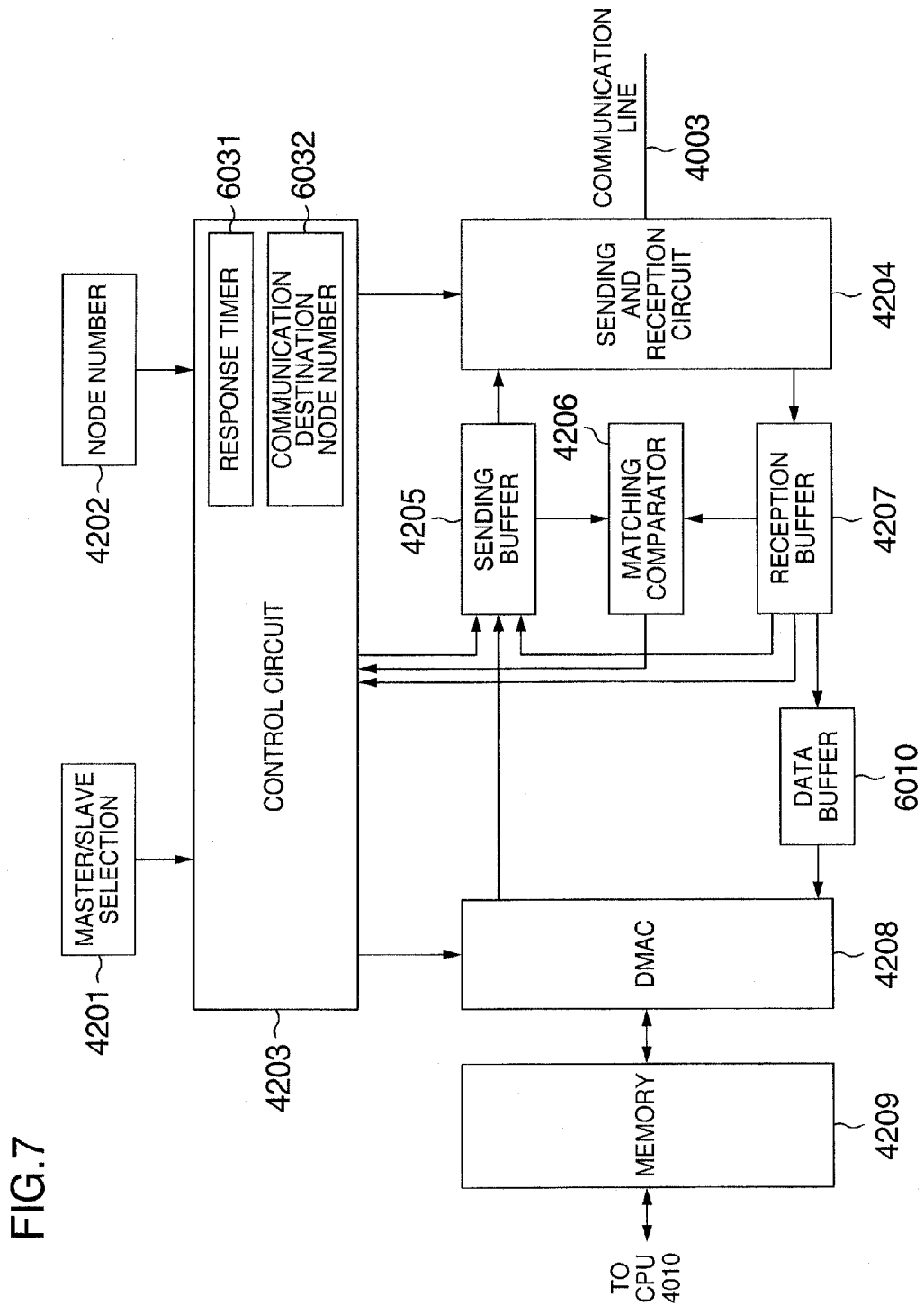
FIG. 7 shows a communication control device (master communication control device) of the embodiment.

The details of communication control device 4020 are shown in FIG. 7. Based on a master/slave selection 4201, it is possible to select whether this communication control device is a master communication control device or a slave communication control device. A node number 4202 is the communication line ID (identifier) of this communication control device and must be set to a number which differs from the node numbers of other communication control devices connected to communication line 4003. The connection with CPU 4010 goes through a memory 4209. Memory 4209 is a two-port RAM (Random Access Memory). Since communication line 4003 is a serial communication line, a sending and reception circuit 4204 converts parallel data into serial data before sending to the communication line and, after reception from the communication line, converts the serial data into parallel data. Further, as for communication line 4003, even if all of it is not a serial communication line, it is of course acceptable if only a part is a serial communication line.

Communication control device 4021 is of the same type as communication control device 4020.

Figure 8:
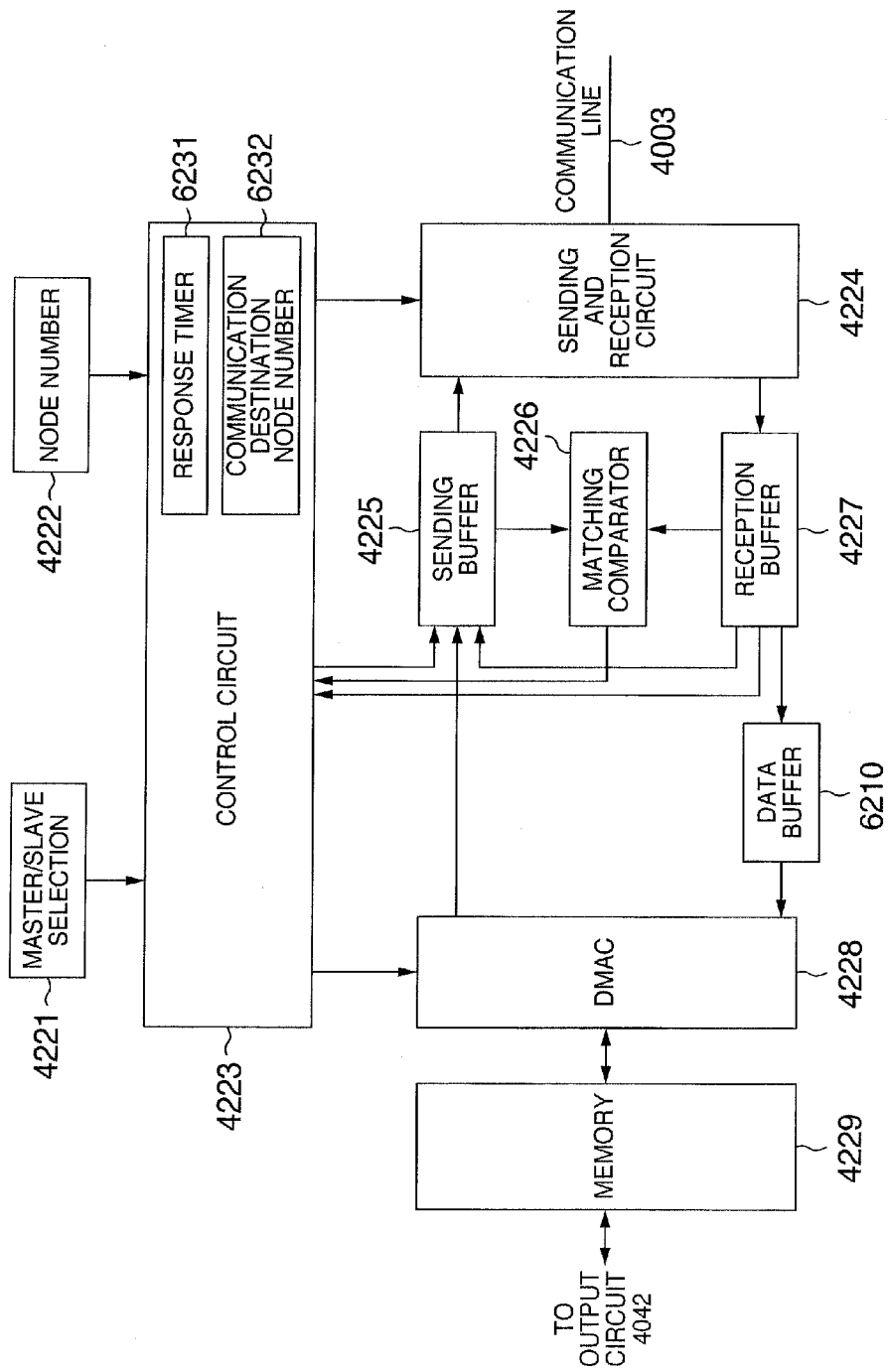
FIG. 8 shows a communication control device (slave communication control device connected to the output circuit) of the embodiment.

The details of communication control device 4022 are shown in FIG. 8. It is of the same type as communication control device 4020, but it is connected to an output circuit 4042 via a memory 4229.

Figure 9:
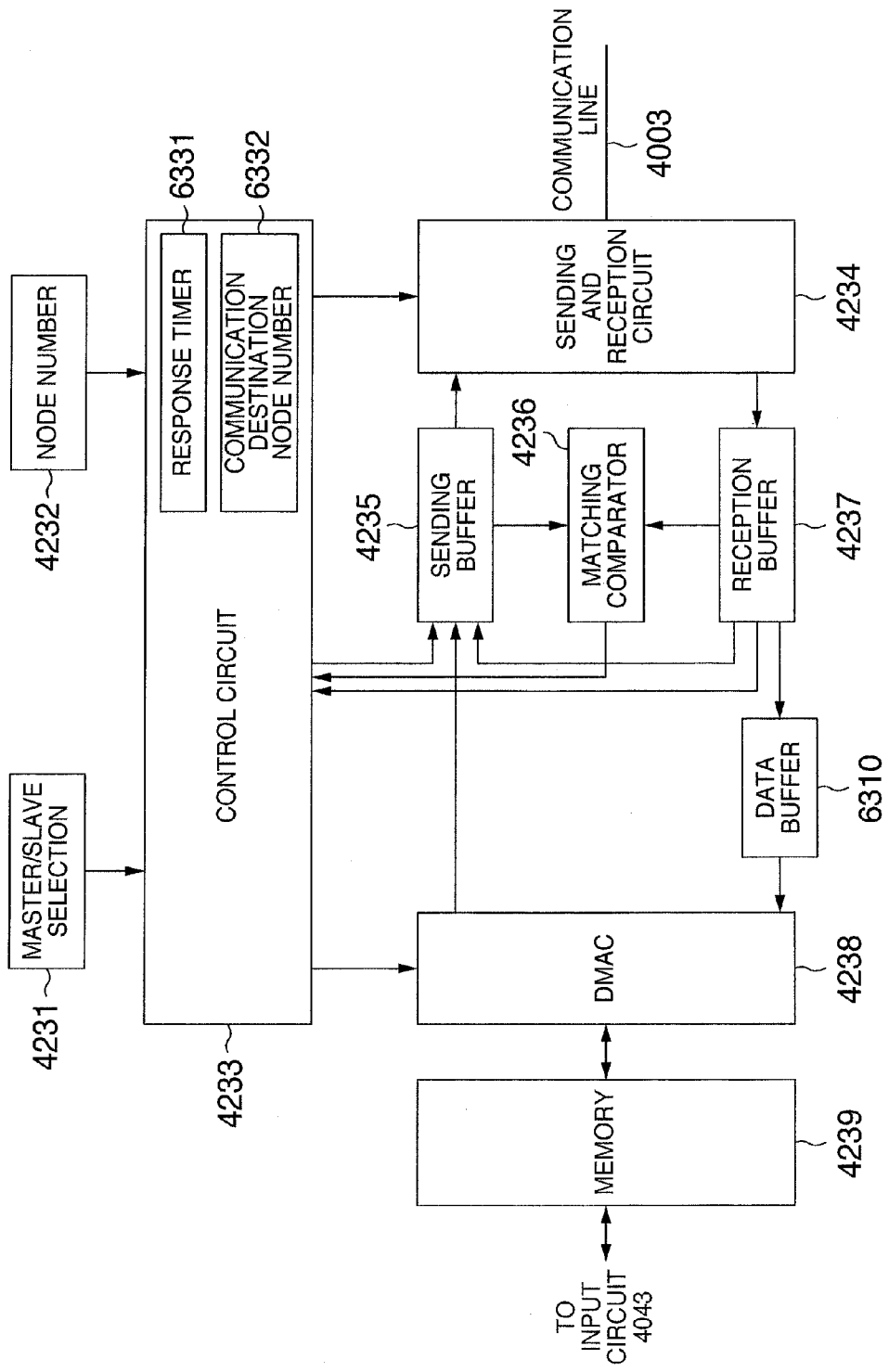
FIG. 9 shows a communication control device (slave communication control device connected to the input circuit) of the embodiment.

The details of communication device 4023 are shown in FIG. 9. It is of the same type as communication control device 4020, but it is connected to an output circuit 4043 via a memory 4239.

The communication procedure of output data from CPU 4010 up to output circuit 4042 will be explained on the basis of the timechart of FIG. 10.

CPU 4010 saves (t1) the output data to memory 4209 at regular intervals.

Communication control device 4020 on the sending side sends output data at regular intervals. A control circuit 4203 stores "2", the node number of slave communication control device 4022, in communication destination node number 6032 and, in order to generate frame OREQ1, instructs a DMAC 4208 to transfer the output data to a sending buffer 4205 and, after transfer, makes a request to send (t2) to sending and receiving circuit 4204.

Communication control device 4020 sends frame OREQ1 to communication line 4003 and, after sending completion, activates (t3) a response timer 6031.

Communication control device 4022 on the reception side receives frame OREQ1 and introduces it into a reception buffer 4227. If the frame sending destination address is "2", indicating that it is itself the destination, and the control field is OR1, control circuit 4223 stores destination address "0" in communication destination node number 6232. The output data saved in reception buffer 4227 are transferred to a data buffer 6210, and also, in order to generate frame OACK1, the output data saved in reception buffer 4227 are transferred (t4) to a sending buffer 4225.

Communication control device 4022 sends frame OACK1 to communication line 4003 and, after completion of sending, activates a response timer 6231. Communication control device 4020 receives frame OACK1 and introduces it in reception buffer 4207. If, after completion of reception, the frame destination address is "0", indicating that it is itself the destination, the source address coincides with communication destination address number 6032, the control field is OA1, and the output data of sending buffer 4205 and the output data (echo back) of reception buffer 4207 coincide in a matching comparison by a matching comparator 4206, response timer 6031 is halted (t5). Control circuit 4203 saves (t6) in frame OREQ2 in sending buffer 4205.

Communication control device 4020 sends frame OREQ2 to communication line 4003 and, after completion of sending, activates (t7) response timer 6031.

Communication control device 4022 receives frame OREQ2 and introduces it in reception buffer 4227. If the frame destination address is "2", indicating that it is itself the destination, the source address coincides with communication destination node number 6232, and the control field is OR2, and response timer 6231 is halted. Control circuit 4223 instructs (t8) a DMAC 4228 to save the output data saved in the data buffer in memory 4229. It saves (t9) frame OACK2 in sending buffer 4225.

Communication control device 4022 sends frame OACK2 to communication line 4003. Communication control device 4020 receives frame OACK2 and introduces it in reception buffer 4207. If, after completion of reception, the frame destination address is "0", indicating that it is itself the destination, the source address coincides with communication destination address number 6032, the control field is OA2, and response timer 6031 is halted (t10). Thereafter, the subsequent data communication is executed.

Output circuit 4042 reads memory 4229 at regular intervals and outputs (t11) the output data.

According to the aforementioned operation, it is possible to output the transferred output data after checking that they are not erroneous.

When, during the communication procedure, the master communication control device and the slave communication control device together find that the checked portions of the sending destination address, the source address, the control field, the data and so forth, of a received frame, do not have the expected values, they monitor the received frames and wait for received frames until the response timers have timed out and the expected values are received.

In case the response timer in the master communication control device has timed out, the current data communication is terminated, and the subsequent data communication is executed.

In case the response time in the slave communication control device has timed out, the current data communication is terminated, and the device waits for the subsequent data communication.

Figure 11:
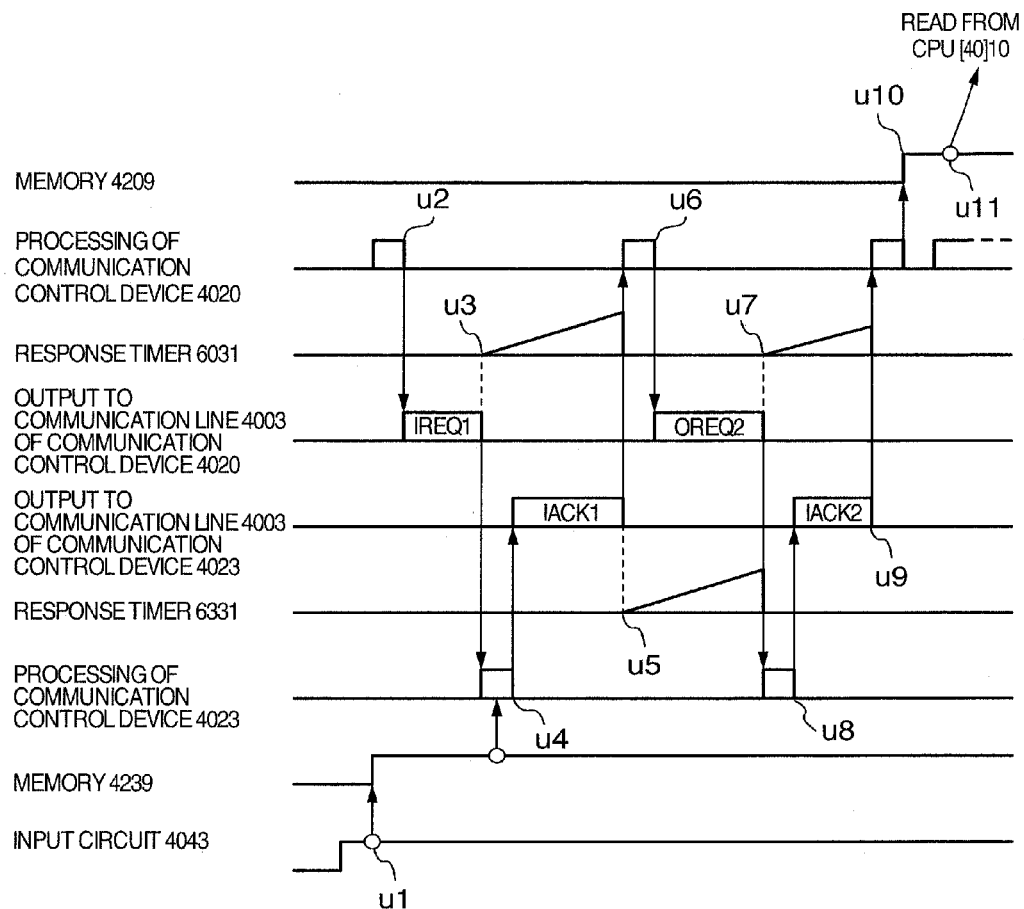
FIG. 11 is a time chart of an input data communication procedure of the embodiment.

Next, the input data communication procedure from input circuit 4043 up to CPU 4010 will be explained based on FIG. 11.

Figure 10:
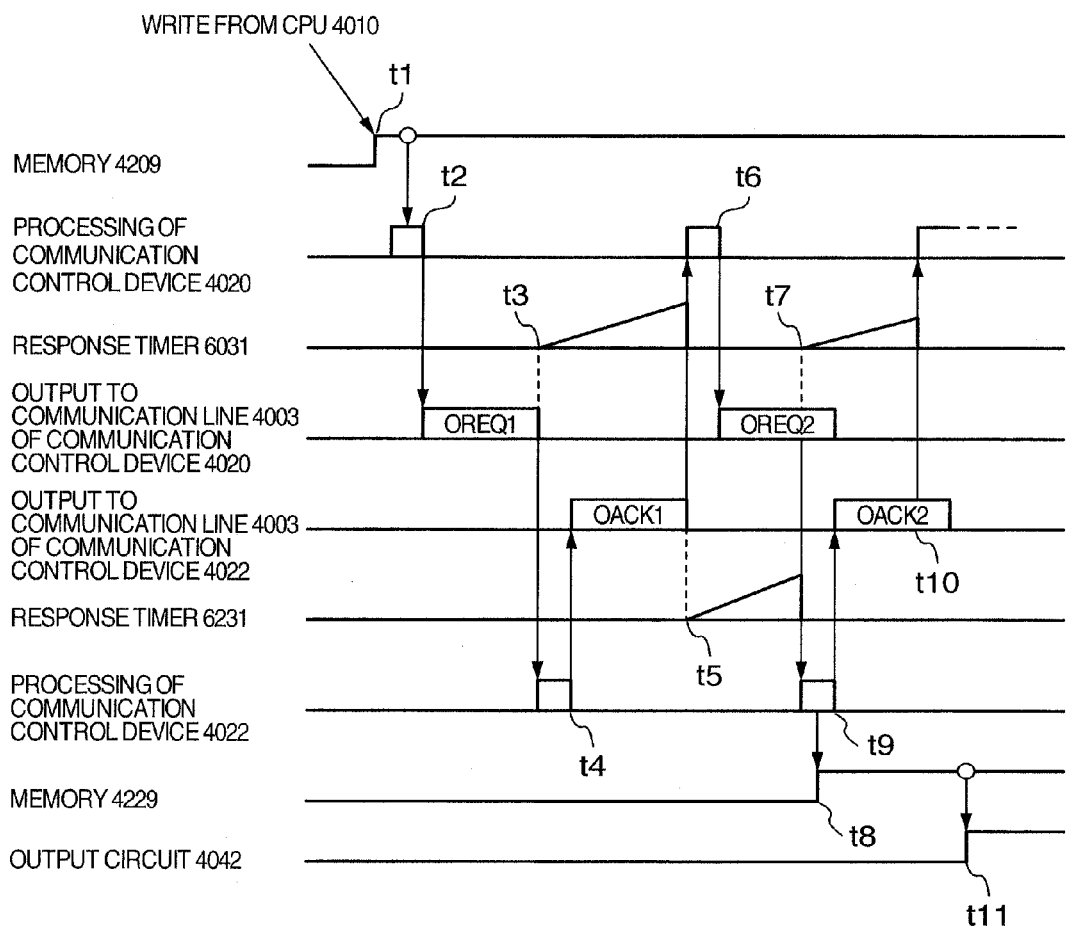
FIG. 10 is a time chart of an output data communication procedure of the embodiment.

The difference with FIG. 10 is that, since the data transfer direction is the opposite, the order of the frames including data is different and the timing of the data matching comparison is different. Since the checking and timeout monitoring of addresses and control fields are the same as in FIG. 10, they will be omitted in the explanation below.

Input circuit 43 saves (u1) the input data in memory 4239 at regular intervals.

Communication control device 4020 sends input request frames at regular intervals. The same processing as in FIG. 10 is performed, but no data are included in frame IREQ1 (u2, u3).

Communication control device 4023 includes input data in frame IACK1 and sends it (u4, u5).

Communication control device 4020 includes input data (echo back) in frame IREQ2 and sends it (u6, u7).

Communication control device 4023 sends frame IACK2 (u8, u9) if the input data of a reception buffer 4235 and the input data (echo back) of a reception buffer 4237 are found by comparison in a matching comparator 4236 to coincide.

Communication control device 4020, after receiving frame IACK2, saves the input data in memory 4209 (u10).

CPU 4010 reads memory 4209 at regular intervals (u11).

As explained above, it is possible, with respect to the communication of input data and output data related to the safety function, to implement detection of masquerading, together with a reduction in the missed error rate.

Figure 12:
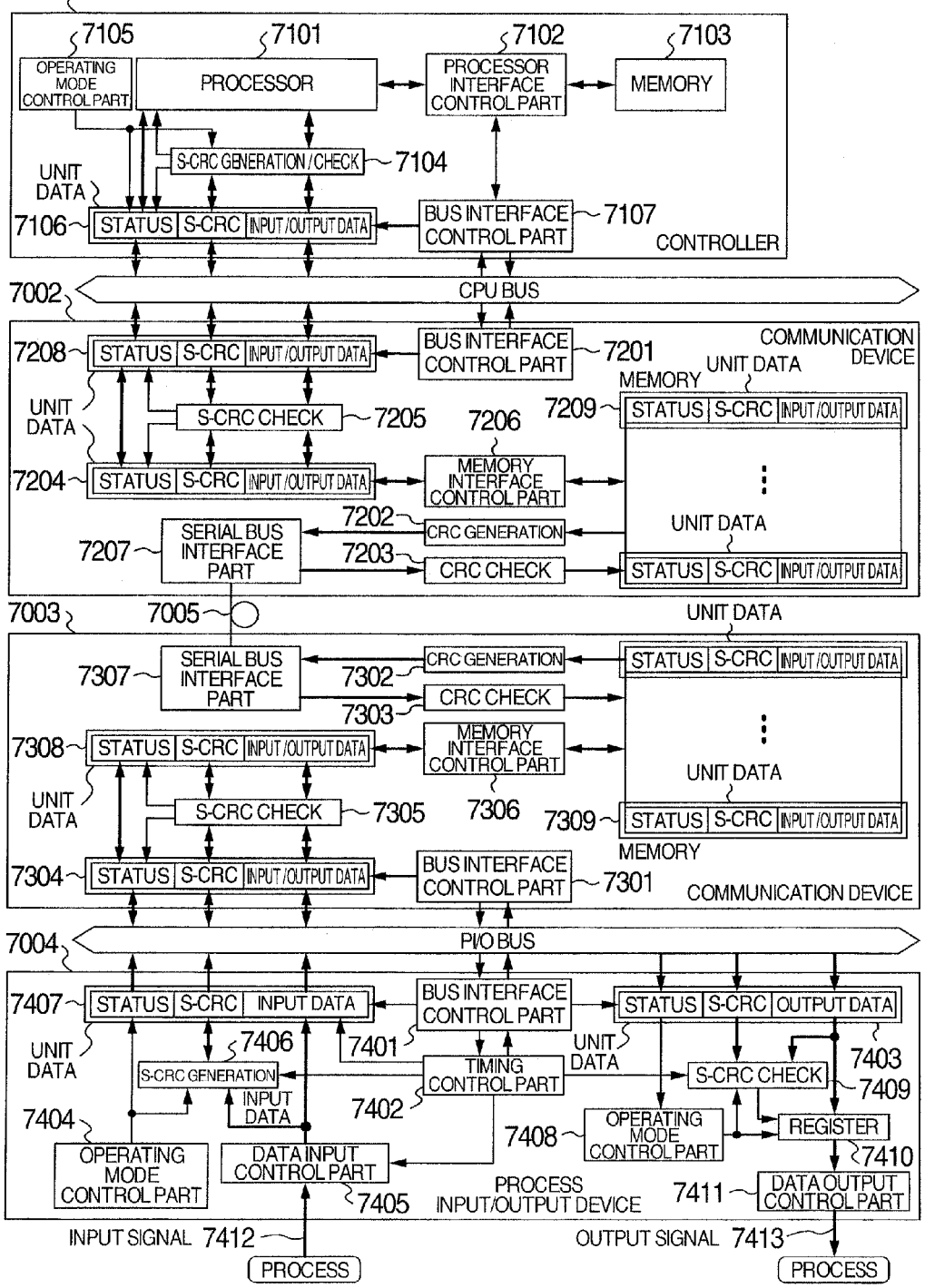
FIG. 12 is a block diagram showing yet another embodiment.

Regarding another example, shown in FIG. 12, there will first be given a conceptual explanation. The example has a process input/output device 7004 and a controller 7001 controlling the input and output of the process, comprising an S-CRC generation/check circuit 7104 (S-CRC generation circuit 7406) as well as an operating mode control part 7105 (7404), and is configured to operate/halt S-CRC generation/check circuit 7104 (S-CRC generation circuit 7406) in response to the output of operating mode control part 7105 (7404). In case operating mode control part 7105 is set to a mode (hereinafter called the safe mode) making S-CRC generation/check circuit 7104 operate, the S-CRC generation circuit 7406 of process input/output device 7004 adds an S-CRC code to the data when data are sent from process input/output device 7004 to controller 7001, and sends them to controller 7001 via a communication device, checks the data received by controller 7001 and the S-CRC code added in process input/output device 7004 and, in case there was an error, destroys them and simultaneously raises an error status item without using the corresponding received data. In case, on the contrary, data are sent from controller 7001 to process input/output device 7004, an S-CRC code is added by the S-CRC generation/check circuit 7104 installed in controller 7001 to the data sent to process input/output device 7004 and sent to process input/output device 7004, an S-CRC check circuit 7409 installed in process input/output device 7004 performs an S-CRC check with respect to received data from controller 7001 and, in case there was an error, destroys them and raises an error status flag. Further, by performing a check, in communication devices 7002 and 7003 carrying out sending and reception of data between controller 7001 and process input/output device 7004, of the data and S-CRC code received from controller 7001 as well as of the data and the S-CRC code received from process input/output device 7004, it is possible to raise the reliability of data communication between terminals from controller 7001 up to process input/output device 7004. In case operating mode control part 7105 (7404) is set to a mode (hereinafter called the normal mode) halting S-CRC generation/check circuit 7104 (S-CRC generation circuit 7406), S-CRC generation and checking in controller 7001 and process input/output device 7004 are not carried out.

As described above, not only between terminals of controller 7001 and input/output device 7004 but also in communication devices 7002 and 7003 relaying the communications of both, it is possible, by choosing a configuration in which a check is performed of S-CRC codes generated in both terminals, to prevent data in the normal mode, in which a S-CRC code is not added, from being mistakenly output to process input/output device 7004 in the safe mode, or to prevent input data of process input/output device 7004 in the normal mode from being mistakenly stored in data domains related to the safety function of controller 7001, so it becomes possible to consolidate the conventional system which has been split into a partial device assuming responsibility for availability and a partial device assuming responsibility for safety.

Also, the data format with which sending and reception is carried out between controller 7001 and process input/output device 7004 is constituted by the address and the input/output data (subsequently called the data) of process input/output device 7004, the S-CRC code for the data, and status information indicating the operating mode and malfunction state of the device; an operating mode control part 7105 (7404) installed in controller 7001 and process input/output device 7004 reflects, during sending of data, the operating mode flag, a flag identifying whether the data sent and received are in the safe mode or in the normal mode, within the status information of the data format; and communication devices 7002 and 7003 relaying the sending and reception of data between controller 7001 and process input/output device 7004 have a means of checking the aforementioned operating mode flag and perform a CRC check only in the case that the operating mode flag is in the safe mode, and do not perform a CRC check in the case of the normal mode.

Further, controller 7001 and process input/output device 7004 have means of checking whether the operating mode flag of the received data and their own operating modes coincide, check whether the operating modes on the data sending side and reception side coincide, and, in case the operating modes do not coincide, do not give permission on the side of process input/output device 7004 to output to the process, and operate so that, on the side of controller 7001, output of the corresponding data, to a processor 7101 or a memory or the like inside controller 7001, is forbidden.

In addition, by providing registers reflecting an S-CRC error among the status information of the communication data format between controller 7001 and process input/output device 7004 separately in controller 7001, relay communication devices 7002 and 7003, and process input/output device 7004, it becomes easy to designate the place of occurrence of the error, so it becomes possible to designate the place of malfunction during the occurrence of a malfunction and to shorten the time for analysis and repair.

Figure 13:
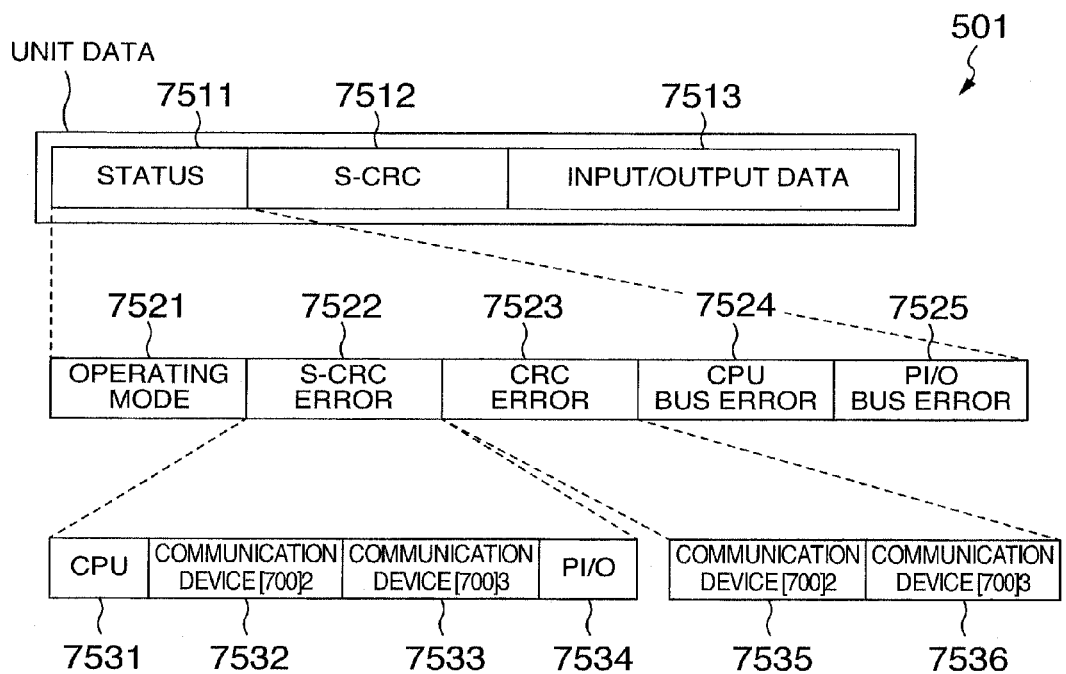
FIG. 13 is an explanatory diagram showing a data format with which sending and reception is carried out between the controller and the process input/output device.
Figure 14:
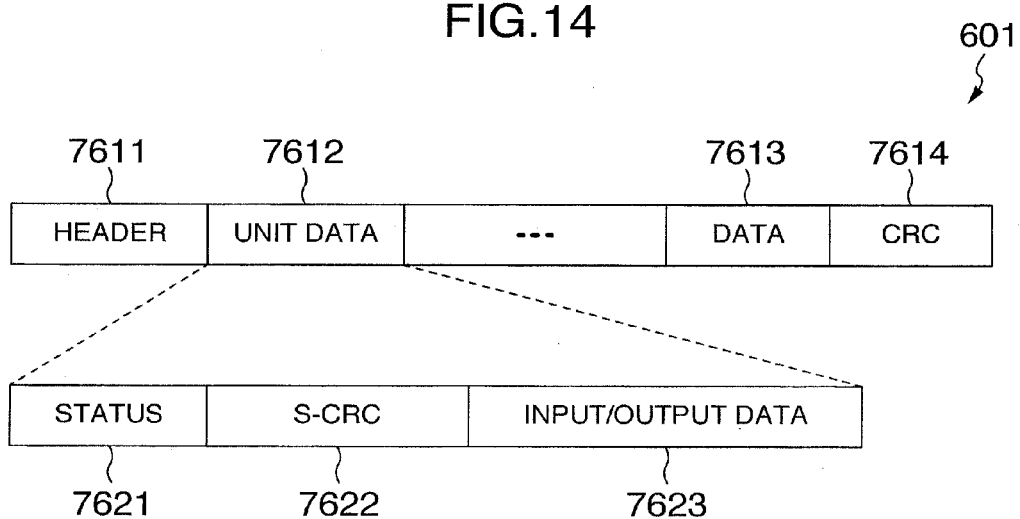
FIG. 14 is an explanatory diagram showing the format of a frame which is transferred between the communication devices.

Although it is in part a repetition of the aforementioned explanation, the example will be explained in detail with reference to FIG. 12, FIG. 13, and FIG. 14. FIG. 12 is a block diagram showing an embodiment of the present invention. FIG. 13 is an explanatory diagram the data format with which the transfer of data is performed between process input/output device 7004 and controller 7001. FIG. 14 is an explanatory diagram showing the frame format of the serial transmission of data communication of communication device 7002 and communication device 7003 shown in FIG. 12.

First, an explanation of the outline of the general configuration and the operation of each part will be given with FIG. 12.

In the present diagram, a programmable electronic control device is constituted internally by a controller 7001 having in its interior a processor memory or the like, a process input/output device 7004 which is the input/output interface with the plant process, and a communication device 7002 and a communication device 7003, serving as relay communication devices carrying out the relaying of data communication between controller 7001 and process input/output device 7004.

First, an explanation will be given regarding the case where the output data to the process from controller 7001 to process input/output device 7004 are sent with the safe mode.

The data output from processor 7101 are stored in a memory 7103 for the time being. These data are e.g. process control data computed on the basis of process state information from process input/output device 7004. The data stored in this memory 7103 by instruction from processor 7101 have an S-CRC code added by S-CRC generation/check circuit 7104 and are saved in a register 7106. Here, S-CRC is a CRC (Cyclic Redundancy Check) code added with respect to the safety data during the sending of the data, by controller 7001 or process input/output 7004. Specifically, the data are delimited in a prescribed manner, a CRC code in the 16 to 32 bit range is generated based on these data, and when the data are sent, the data are sent together with this CRC code and it is checked on the reception side where the relationship between the data and the CRC code is correct, this being a detection of errors. This is to say that, based on the data, a calculation combining a shift called the CRC generating polynomial, addition, and the like, is performed, this being added to the data as a CRC code and sent, and upon reception, the received data is operated on with the CRC polynomial, this being a method of checking coincidence with the received CRC code. Further, the details will be described subsequently, but in the present embodiment, CRC with respect to the input/output data is called S-CRC and, moreover, CRC with respect to the frame shall simply be called CRC.

The decision as to whether controller 7001 operates in the safe mode or in the normal mode is managed by operating mode control part 7105. In the status portion of register 7106, there are several registers indicating the device operating mode and malfunction state, and by instruction from operating mode control part 7105, it is reflected in the status part of register 7106 whether controller 7001 is in the safe mode or in the normal mode. Further, the combination of the status information, the S-CRC code, and the input/output data are called unit data. The unit data, being the contents of register 7106, are copied to a register 7208 by a bus interface control part 7107 of controller 7001 and a bus interface control part 7201 of communication device 7002.

In communication device 7002, the status part of register 7208 is copied directly to a register 7204, it being checked by an S-CRC check circuit 7205 whether there is any error in the input/output data on the basis of the S-CRC code, and the input/output data are copied to register 7204. In case an error was verified in the input/output data with the S-CRC check in S-CRC check circuit 7205, S-CRC check circuit 7205 reflects, to the status part of register 7204, a flag indicating that an S-CRC error has occurred in communication device 7002. The contents of register 7204 are stored in memory 7209 via a memory interface control part 7206. If the unit data (status information, S-CRC code and input/output data combined) are stored in memory 7209, the subsequent unit data are copied from register 7106 of controller 7001 to register 7208 of communication device 7002 and are stored, via memory interface control part 7206, in memory 7209 by addition to the previously stored unit data. This operation is carried out repeatedly, so plural items of unit data are stored in memory 7209.

If a designated number of unit data items are stored in memory 7209, the system moves to sending operation. As shown in FIG. 14, as for the contents stored in memory 7209, several unit data 7612 and 7613 items are consolidated serially, and simultaneously with the configuration of a sending frame by the addition of a header 7611 in a CRC generation circuit 7202, a frame 7601 is configured by adding a frame CRC code 7614. In this way, the data error detection effect is improved by adding a dual error check with S-CRC codes added for each input/output unit data item and CRC codes added for each frame. The sent frame generated in CRC generation circuit 7202 is converted into serial data in a serial bus interface part 7207 and is sent to a serial bus interface part 7307 of communication device 7003 via a communication medium 7005. Further, as shown in FIG. 13, in unit data 7612 constituting frame 7601, as status information 7511, if an error is detected in S-CRC check circuit 7205, an S-CRC error 7522 is added, and if an error is detected in CRC check circuit 7203, a CRC error 7523 is added. The explanation is in reversed order, but, in order to understand further in which circuit the error was detected, e.g., in case an error has been detected in the CPU, S-CRC error 7522 and CRC error 7523, in order to be postscripted in CPU 7521, are postscripted as in communication device 7002 (7532), communication device 7003 (7533), a PI/0 7534, or as in communication device 7002 (7535) and communication device 7003 (7536).

In communication device 7003, serial bus interface part 7307 sends the received frame to CRC check circuit 7303, and CRC check circuit 7303 performs a check of the CRC codes added for each frame, decomposes the information from the frame into individual data items and stores them in memory 7309. The data stored in memory 7309 are sent via memory interface part 7306 to register 7308 and next, the status part of register 7308 is directly copied to the status part of a register 7304, and the S-CRC code and the input/output data part are copied to register 7304 after implementation of a check of the S-CRC in an S-CRC check circuit 7305. In case an error has detected in S-CRC check circuit 7305, status information indicating that an S-CRC error has occurred in communication device 7003 is reflected in the status information of register 7304. The contents of register 7304 are copied by a bus interface control part 7301 and a bus interface control part 7401 of process input/output device 7004 to a register 7403 of process input/output device 7004.

In process input/output device 7004, as for the S-CRC code and the output data copied to register 7403, an instruction of a timing control part 7402 is received and an S-CRC check is carried out in S-CRC check circuit 7409. The status part is sent to an operating mode control part 7408 and, together with performing a check of whether the operating mode of the data output source reflected in the status part is the safe mode, it is checked with the flag of the status part whether the error did not occur in the process of transmission of the output data from controller 7001, and only in the case where the operating mode is the safe mode and no error information is included in the status information is the output data part of register 7403 copied to a register 7410, and a data output control part 7411 performs an output of an output signal 7413 to the process.

Next, an explanation will be given regarding the case where data is sent with the safe mode from process input/output device 7004 to controller 7001.

In process input/output device 7004, an input signal 7412 from the process is introduced into process input/output device 7004 by data input control part 7405, the input data are sent simultaneously with being copied to the data part of a register 7407 to S-CRC generation circuit 7406, and S-CRC circuit 7406 generates an S-CRC code with respect to the input data and stores the S-CRC code in the S-CRC part of register 7407. In operating mode control part 7404, before the communication of the input data, the information from controller 7001 as to whether the operating mode is the safe mode or the normal mode is sent via communication device 7002 and communication device 7003. Operating mode control part 7404 reflects the operating mode status information indicating whether the operating mode of process input/output device 7004 is the safe mode or the normal mode in the status part of register 7407. The contents of register 7407 are copied, by bus interface part 7401 and bus interface control part 7301 inside communication device 7003, to register 7304 inside communication device 7003.

In communication device 7003, the status part of register 7304 is directly copied to the status part of register 7308, a check of the S-CRC code and the data part is performed in S-CRC check circuit 7305, and they are respectively copied to the S-CRC and the input/output data part of register 7308 if there is no error. In case an error was detected in S-CRC check circuit 7305, there is raised a flag in the status part of S-CRC check circuit 7308 to the effect that an S-CRC error occurred in communication device 7003. The unit data copied to register 7308 are copied to memory 7309 by means of memory interface control part 7306. A CRC generation circuit 7302 consolidates the plural data units copied to memory 7309 and, together with configuring the transmission frame, generates a CRC code with respect to the frame and sends it to serial bus interface part 7307. Serial bus interface part 7307 converts the received frame to serial data and sends it through medium 7005 to serial bus interface part 7207 of communication device 7002.

In communication device 7002, serial bus interface part 7207 sends the received frame to CRC check circuit 7203, CRC check circuit 7203 checks the presence of a CRC error with respect to the received frame, decomposes the frame into individual data items, and stores them in memory 7209. The data of memory 7209 are copied to register 7204 by memory interface control part 7206, the status part of register 7204 is directly copied to register 7208, an S-CRC check is carried out on the S-CRC and the input/output data parts with S-CRC check circuit 7205 and, if there is no error, they are respectively copied to the S-CRC part and the input/output data part of register 7208. In case an error was found with S-CRC check circuit 7205, S-CRC check circuit 7205 raises a flag in the status part of register 7208 to the effect that an S-CRC error has occurred in communication device 7002. The data of register 7208 are copied to register 7106 by bus interface control part 7201 and bus interface control part 7107 of controller 7001.

In controller 7001, operating mode control part 7105 checks, by the operating mode flag of the data sending source of the status part of register 7106, whether the sending source is in the safe mode, and if it is not in the safe mode, it sends error information to processor 7101 and discards the data of register 7106. In case it is verified that the sending source is in the safe mode, the S-CRC part and the data part of register 7106 are sent to S-CRC generation/check circuit 7104, and in case there is no error found as a result of the S-CRC check, the input/output data are sent to processor 7101.

In the communication of data in the normal mode between controller 7001 and input/output device 7004, data sending and reception are performed by a setting of the status or by the operating mode control parts 7105 and 7404, without operation of S-CRC generation/check circuit 7104, S-CRC check circuits 7205 and 7305, S-CRC generation circuit 7406, or S-CRC check circuit 7409, and for the other parts, are carried out in the same way as in the safe mode. As a result of this, in the sending and reception of data from controller 7001 up to process input/output device 7004, it becomes possible, without changing the data format or the frame configuration for transmission between communication device 7002 and communication device 7003, to implement both the safe mode and the normal mode with the same devices, including relaying communication device 7002 and communication device 7003.

An explanation will be given regarding the case where output data to a process is sent with the normal mode from controller 7001 to process input/output device 7004. In particular, the explanation will mainly be given for points which differ from the safe mode, so regarding portions which are the same as for the safe mode, the explanation will be omitted in part.

Data which are output from processor 7101 are stored in memory 7103 for the time being. The data stored in this memory 7103 are stored, in a way differing from the safe mode, without operation of S-CRC generation/check circuit 7104 and without any item being added to the S-CRC domain, in register 7106.

The decision as to whether controller 7001 operates in the safe mode or in the normal mode is managed by operating mode control part 7105. It is reflected in the status part of register 7106 whether controller 7001 operates in the safe mode or the normal mode. The unit data, being the contents of register 7106, are copied to register 7208 by bus interface control part 7107 of controller 7001 and bus interface control part 7201 of communication device 7002.

In communication device 7002, the status part of register 7208 is directly copied to register 7204. In a way differing from the safe mode, S-CRC check circuit 7205 does not operate, so without performing an error check of the input/output data based on S-CRC, the data are copied to register 7204. The contents of register 7204 are stored in memory 7209 via memory interface control part 7206. If unit data (status information and input/output data combined) are stored in memory 7209, the subsequent unit data are copied from register 7106 of controller 7001 to register 7208 of communication device 7002 and, via memory interface control part 7206, are stored in memory 7209 by addition to the previously stored unit data. This operation is carried out repeatedly to store a plurality of unit data items in memory 7209. Further, nothing is stored in the S-CRC domain.

If a designated number of unit data items are stored in memory 7209, the system moves to sending operation. As shown in FIG. 14, as for the contents stored in memory 7209, several unit data 7612 and 7613 items are consolidated serially, and simultaneously with the configuration of a sending frame by the addition of a header 7611 in a CRC generation circuit 7202, a frame 7601 is configured by adding a frame CRC code 7614. In the safe mode, an S-CRC code is added for each input/output unit data item and a CRC code is added for each frame, but in the normal mode, the check is limited to a CRC error check. The frame for sending, generated in CRC generation circuit 7202, is converted to serial data in serial bus interface part 7207 and sent, via communication medium 7005, to serial bus interface part 7307 of communication device 7003.

In communication device 7003, serial bus interface part 7307 sends the received frame to CRC check circuit 7303, and CRC check circuit 7303 performs a check of the CRC codes added for each frame, decomposes the information from the frame into individual data items and stores them in memory 7309. The data stored in memory 7309 are sent via memory interface part 7306 to register 7308 and next, the status part of register 7308 is directly copied to the status part of a register 7304, and the S-CRC (in which nothing is stored) and the input/output data parts are copied to register 7204 without the S-CRC check based on S-CRC check circuit 7305 being performed, since they are in the normal mode. The contents of register 7304 are copied to register 7403 of process input/output device 7004 by means of bus interface control part 7301 and bus interface control part 7401 of process input/output device 7004.

In process input/output device 7004, regarding the S-CRC (in which nothing is stored) copied to register 7403 and the output data, since the system is in the normal mode, no S-CRC check is carried out by S-CRC check circuit 7409. The status part is sent to operating mode control part 7408 and, together with performing a check of whether the operating mode of the data output source reflected in the status part is the normal mode, it is checked with a flag of the status part whether an error did not occur in the output data in the transmission process from controller 7001, and in case no error information is included, the output data part of register 7403 is copied to register 7410, and data output control part 7411 performs an output of output signal 7413 to the process.

Next, an explanation will be given regarding the case where data are sent in the normal mode from process input/output device 7004 to controller 7001.

In process input/output device 7004, input signal 7412 from a process is introduced by data input control part 7405 into process input/output device 7004, and the input data are copied to the data part of register 7407. Since the system is in the normal mode, S-CRC circuit 7406 does not operate. Nothing is stored in the S-CRC domain. In operating mode control part 7404, before the communication of the input data, information on whether the operating mode is the safe mode or the normal mode is sent from controller 7001 via communication device 7002 and communication device 7003. Operating mode control part 7404 reflects the operating mode status, indicating whether the operating mode of process input/output device 7004 is the safe mode or the normal mode, to the status part of register 7407. The contents of register 7407 are copied to register 7304 inside communication device 7003 by means of bus interface part 7401 and bus interface control part 7301 inside communication device 7003.

In communication device 7003, the status part of register 7304 is directly copied to the status part of register 7308. Since the system is in the normal mode, the data are copied to the input data part, without carrying out a check in S-CRC check circuit 7305. At this point, nothing is stored in the S-CRC domain. The unit data copied to register 7308 are copied to memory 7309 by means of memory interface control part 7306. CRC generation circuit 7302 consolidates the plural data units copied to memory 7309 and, together with configuring the transmission frame, generates a CRC code with respect to the frame, and sends it to serial bus interface part 7307. Serial bus interface part 7307 converts the received frame to serial data and sends them via medium 7005 to serial bus interface part 7207 of communication device 7002.

In communication device 7002, serial bus interface part 7207 sends the received frame to CRC check circuit 7203 and CRC check circuit 7203 checks for the presence of a CRC error with respect to the frame and decomposes the frame into individual data units and stores them in memory 7209. The data of memory 7209 are copied to register 7204 by memory interface control part 7206 and the status part of register 7204 is directly copied to register 7208, and, since the operating mode is the normal mode, the data are respectively copied to the input/output data part, without performing the S-CRC check in S-CRC check circuit 7205. The data of register 7208 are copied to register 7106 by bus interface control part 7201 and bus interface control part 7107 of controller 7001. Nothing is stored in the S-CRC domain.

In controller 7001, operating mode control part 7105 checks the sending source with operating mode flag of the data source of the status part of register 7106 and sends the input/output data to processor 7101.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A receiving device comprising:
a receiver receiving two frames, each including substantially same data attached thereto with a data error detection code, a frame error detection code, and safety flag information indicating a safety function or not, respectively;
a first detector connected to the receiver for performing error detection of the frames by use of the frame error detection code, respectively;
a second detector connected to the receiver for performing error detection of the data by use of the data error detection code, respectively; and
a Direct Memory Access Controller (DMAC) connected to the first and second detectors for outputting one among the data included in the two frames under a condition of the safety function in the two frames when no error is detected in the frame and data error detections.

2. The receiving device in claim 1, wherein the receiver receives the two frames via mutually different communication lines, and stores the two frames in at least two reception buffers.

3. The receiving device in claim 1, further comprising:
a comparator comparing each bit of the data of the two frames;
wherein the DMAC determines no error detected based on the output of the comparator.

4. The receiving device in claim 1,
wherein the DMAC outputs a preset safety output value in substitution for the data included in the two frames, when an error has occurred in the frame or data error detection.

5. The receiving device in claim 1, wherein a validity flag indicating whether or not the data is valid is included in said frames, and wherein the DMAC outputs a preset safety output value in substitution for the data included in the two frames when the validity flag indicates the data is not valid.

6. A communication system, comprising:
a sending device for attaching to a substantially same data error detection code, a frame error detection code, and safety flag information indicating a safety function or not, to first and second frames so as to generate and send two frames; and
a receiving device connected with the sending device for receiving the two frames, performing error detection of the frames by use of the frame error detection code, performing error detection of the data by use of the data error detection code, and, for outputting one among the data included in the two frames, under a condition of the safety function in the two frames when no error is detected in the frame and data error detections.

* * * * *